(12) United States Patent
Van Der Helm et al.

(10) Patent No.: US 12,345,282 B2
(45) Date of Patent: *Jul. 1, 2025

(54) AIR HANDLING SYSTEM FOR A CLIMATE CONTROL SYSTEM IN A DELIMITED SPACE, CLIMATE CONTROL SYSTEM FOR CLIMATE CONTROL IN A DELIMITED SPACE, MODULAR UNIT COMPRISING A DELIMITED SPACE AND CLIMATE CONTROL SYSTEM AND AN ASSEMBLY OF MODULAR UNITS

(71) Applicant: PRIVA B.V., De Lier (NL)

(72) Inventors: Reinierus Theodorus Cornelis Van Der Helm, Delft (NL); Cornelis Marinus Gijsbertus Adrianus Maria Breukel, Delft (NL)

(73) Assignee: PRIVA B.V., De Lier (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,324

(22) Filed: May 19, 2023

(65) Prior Publication Data

US 2023/0287909 A1 Sep. 14, 2023

Related U.S. Application Data

(63) Continuation of application No. 15/776,366, filed as application No. PCT/NL2015/050806 on Nov. 18, 2015, now Pat. No. 11,692,564.

(51) Int. Cl.
| | | |
|---|---|---|
| *A01F 25/00* | (2006.01) | |
| *A01G 9/24* | (2006.01) | |
| *F15D 1/02* | (2006.01) | |

(52) U.S. Cl.
CPC .............. *F15D 1/025* (2013.01); *A01F 25/00* (2013.01); *A01G 9/24* (2013.01); *Y02A 40/25* (2018.01)

(58) Field of Classification Search
CPC ... F15D 1/025; F15D 1/14; F15D 1/08; F15D 1/02; A01F 25/00; A01G 9/24;
(Continued)

(56) References Cited

U.S. PATENT DOCUMENTS

| | | |
|---|---|---|
| 3,303,771 A | 2/1967 | Nesher et al. |
| 4,928,582 A | 5/1990 | Elfverson |

(Continued)

FOREIGN PATENT DOCUMENTS

| | | |
|---|---|---|
| GB | 1 491 265 A | 11/1977 |
| JP | S49-13954 A | 2/1974 |

(Continued)

OTHER PUBLICATIONS

International Search Report, dated Jul. 20, 2016, from corresponding PCT application No. PCT/NL2015/050806.

*Primary Examiner* — Avinash A Savani
*Assistant Examiner* — Ryan L Faulkner
(74) *Attorney, Agent, or Firm* — NIXON & VANDERHYE

(57) ABSTRACT

Air handling system for a climate control system in a housing that includes at least a delimited space with controlled environment, CE space. The air handling system includes an air handling unit, AHU, a pipe system and a perforated plate assembly. The pipe system includes a branched tree-like structure of conduits, that branches in the direction from the air handling unit towards the perforated plate assembly for homogenous distribution of air over the perforated plate assembly such that the air flow through the perforated plate assembly into the CE space is an air flow under laminar flow conditions. Also, a climate system for climate control in such a delimited space, a modular unit including such a delimited space and such a climate system, and an assembly of modular units.

20 Claims, 3 Drawing Sheets

(58) Field of Classification Search
CPC ........ A01G 9/246; Y02A 40/25; Y02A 30/27; F24F 13/062; F24F 13/068; F24F 13/0236
USPC .......................................... 454/338, 42, 232
See application file for complete search history.

(56) References Cited

U.S. PATENT DOCUMENTS

| | | |
|---|---|---|
| 5,493,808 A | 2/1996 | Munday |
| 6,267,666 B1 | 7/2001 | Wilhelmi |
| 8,234,812 B1 | 8/2012 | Colless et al. |
| 2003/0101645 A1 | 6/2003 | Cole et al. |
| 2011/0100592 A1 | 5/2011 | Johnson |
| 2014/0115958 A1 | 5/2014 | Helene et al. |

FOREIGN PATENT DOCUMENTS

| | | |
|---|---|---|
| JP | S50-65044 A | 6/1975 |
| JP | S57-169525 A | 10/1982 |
| JP | S60-089543 U | 6/1985 |
| JP | H03-191725 A | 8/1991 |
| JP | H04-161754 A | 6/1992 |
| JP | H06-323616 A | 11/1994 |
| JP | 2004-257621 A | 9/2004 |
| JP | 2012-122695 A | 6/2012 |
| WO | 2011/119769 A1 | 9/2011 |
| WO | 2014/005156 A2 | 1/2014 |
| WO | 2014/066844 A2 | 5/2014 |

AIR HANDLING SYSTEM FOR A CLIMATE CONTROL SYSTEM IN A DELIMITED SPACE, CLIMATE CONTROL SYSTEM FOR CLIMATE CONTROL IN A DELIMITED SPACE, MODULAR UNIT COMPRISING A DELIMITED SPACE AND CLIMATE CONTROL SYSTEM AND AN ASSEMBLY OF MODULAR UNITS

CROSS REFERENCE TO RELATED APPLICATIONS

This application is a Continuation of application Ser. No. 15/776,366, filed on May 15, 2018, which is the National Phase under 35 U.S.C. § 371 of International Application No. PCT/NL2015/050806, filed on Nov. 18, 2015, all of which are hereby expressly incorporated by reference into the present application.

FIELD OF THE INVENTION

The present invention relates to an air handling system in an delimited space with controlled environment. The present invention further relates to a climate system for climate control in such a delimited space. The present invention further relates to a modular unit comprising such a delimited space and such a climate system. The present invention further relates to an assembly of modular units.

BACKGROUND

Recently crops are being cultivated in delimited spaces with controlled environment, hereafter CE space, for example shipping containers or modular units that comprise such a delimited space, this method is usually called Indoor Farming. Indoor Farming may involve cultivation for the purpose of production or, for example, the cultivation of uniform planting material for greenhouse cultivation or open field applications.

A disadvantage of Indoor Farming is that due to limited volume of the CE space and the closed or semi-closed nature, it is difficult to create a favorable even environment for the cultivation of crops. More specifically, a small difference in temperature and humidity between the CE space and the crops in combination with the large amount of moisture to be removed (due to evaporation of moisture of the crop) requires a high air replacement rate (air change per hour, ACH), but that may result in a turbulent air flow that can negatively influence the growth process of plants.

SUMMARY OF THE INVENTION

An object of the invention is to provide an air handling system configured for providing a relatively high air change per hour in the CE space.

A further object of the invention is to prevent the formation of turbulent flow condition in a CE space while controlling temperature, humidity and air composition.

This object is achieved by an air handling system for a climate control system in a housing that comprises at least a delimited space with controlled environment, CE space, in which the CE space has an upstream end and a downstream end with respect to an air flow generated in the CE space by the air handling system. The air handling system comprises an air handling unit, AHU, a pipe system and a perforated plate assembly comprising at least a main perforated plate. The perforated plate assembly is positioned at the upstream end of the CE space as air inlet. The AHU is arranged in a service space, and is coupled to the perforated plate assembly at the upstream end of the CE space by the pipe system. The pipe system comprises a branched tree-like structure of conduits, that branches in the direction from the air handling unit towards the perforated plate assembly for homogenous distribution of air over the perforated plate assembly such that the air flow through the perforated plate assembly into the CE space is an air flow under laminar flow conditions. Advantageously, relatively high air change per hour in the CE space can be provided for removal of moisture in the CE space without formation of turbulent flow conditions.

According to an embodiment, the present invention relates to the air handling system as described above, wherein the service space is arranged in the same housing as the CE space. Advantageously, a more compact form of air handling system can be used.

According to an embodiment, the present invention relates to the air handling system as described above, wherein the housing has a distance between the upstream end and the downstream end size of about 10 meters.

According to an embodiment, the present invention relates to the air handling system as described above, wherein the housing has the size of a shipping container.

According to an embodiment, the present invention relates to the air handling system as described above, wherein the perforated plate assembly further comprises a secondary perforated plate positioned between the outflow of the branched pipe system and the main perforated plate.

According to an embodiment, the present invention relates to the air handling system as described above, wherein in the flow direction from the air handling unit towards the perforated plate assembly, an overall cross-section of the conduits of the branched pipe system increases at each branching of the branched pipe system. Advantageously, this allows reduce the flow rate relative to the flow rate generated by the AHU.

According to an embodiment, the present invention relates to the air handling system as described above, wherein the laminar flow velocity is lower than about 0.5 m/s, preferably ranges between about 0.1 and about 0.5 m/s.

According to an embodiment, the present invention relates to the air handling system as described above, wherein the perforated area of the main perforated plate is equal or larger than the cross-section area of the outflow of the branched pipe system.

According to an embodiment, the present invention relates to the air handling system as described above, wherein the main perforated plate comprises perforation holes with a cross-section of about 3 mm and a pitch of about 5 mm.

According to an embodiment, the present invention relates to the air handling system as described above, wherein a cross-section of the perforated plate assembly matches with a cross-section of the CE space.

According to an embodiment, the present invention relates to the air handling system as described above, wherein the cross-section of the perforated plate assembly is either about $1 \times 1$ $m^2$ or about $1.5 \times 1.5$ $m^2$.

According to an embodiment, the present invention relates to the air handling system as described above, wherein the perforated area of the secondary perforated plate is equal or larger than the cross-section area of the outflow of the branched pipe system.

According to an embodiment, the present invention relates to the air handling system as described above, wherein the secondary perforated plate comprises secondary perforated holes with a cross-section of about 3 mm and a pitch of about 5 mm.

Moreover, the present invention relates to a Climate Control System for climate control in an delimited space, that consists of at least a CE space (3), comprising an air handling system 5 as described above.

Moreover, the present invention relates to a modular unit comprising a housing arranged with a delimited space, that consists of at least a CE space (3), comprising a climate control system as described above.

Moreover, the present invention relates to a modular unit comprising a housing arranged with a delimited space, that consists of at least a CE space (3), comprising an air handling system as described above.

Moreover, the present invention relates to an assembly of modular units comprising at least a pair of modular units as described above.

According to an embodiment, the present invention relates to the assembly as described above, wherein the modular units are stacked horizontally or vertically.

BRIEF DESCRIPTION OF DRAWINGS

The invention will be explained in more detail below with reference to drawings in which illustrative embodiments thereof are shown. They are intended exclusively for illustrative purposes and not to restrict the inventive concept, of which the scope is defined by the appended claims.

DETAILED DESCRIPTION OF EMBODIMENTS

Figure 1:
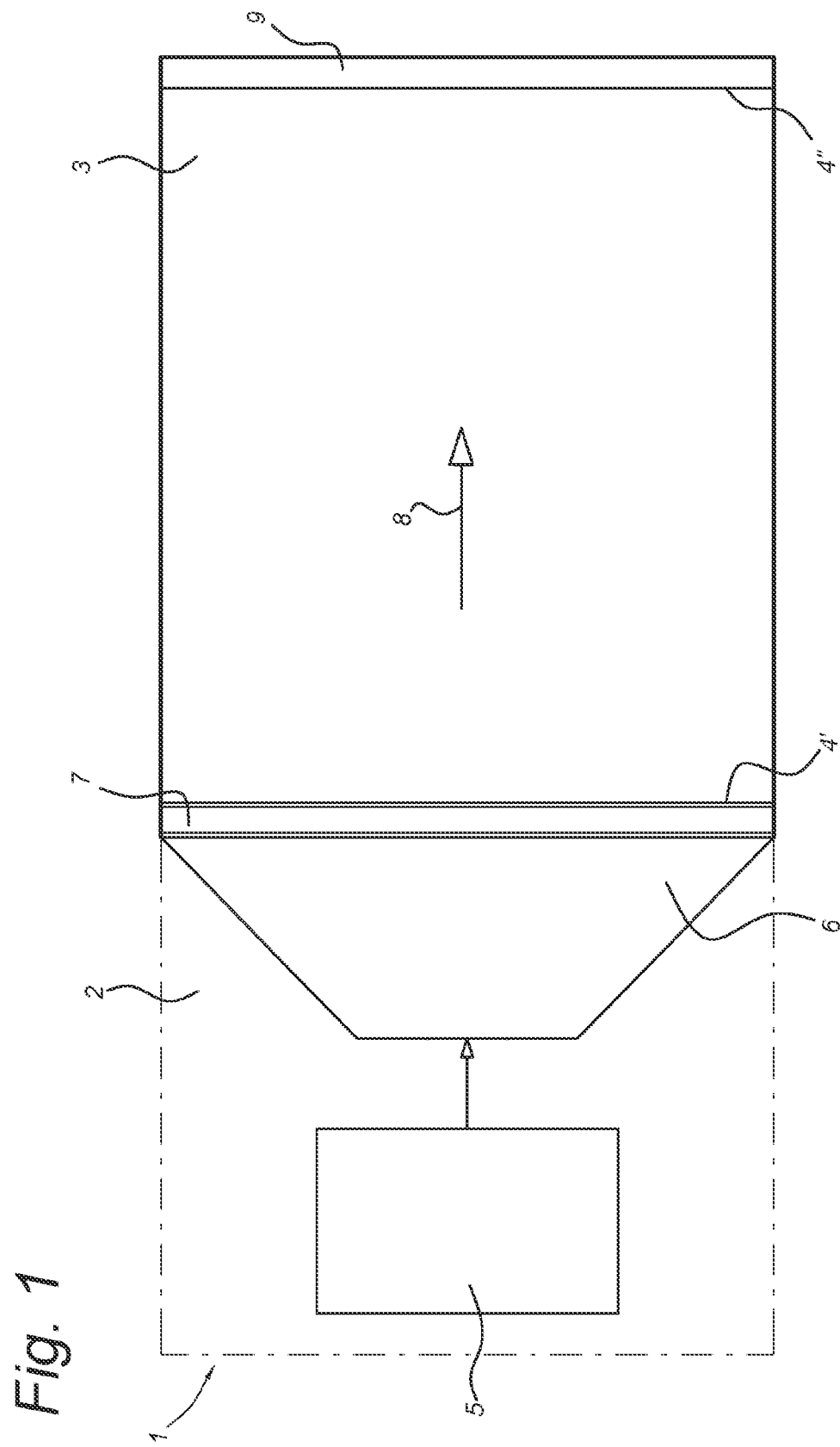
FIG. 1 shows a schematic view of a modular unit comprising an air handling system according to an embodiment of the invention.

FIG. 1 shows a schematic view of a substantially rectangular housing 1 comprising an air handling system. The housing 1 comprises at least a CE space 3, wherein the CE space 3 comprises means for receiving crops. In a longitudinal direction of the housing, the CE space 3 is provided with an upstream end 4', indicating the entry of an air flow 8 into the CE space, and a downstream end 4", i.e., the exit of the air flow 8 from the CE space 3.

The air handling system is provided to create an air flow 8 in the CE space 3. The air flow 8 flows from the upstream end 4' to the downstream end 4" of the CE space 3.

In an embodiment of the invention, an service space 2 is arranged within the same housing as the CE space 3, in a manner that the service space 2 is coupled to the CE space 3 for transmission of an air flow from the service space 2 to the CE space 3. By compacting the service space 2 within the housing the CE space 3 can be optimized for receiving a maximal amount of crops.

Alternatively, the service space 2 can be in a separate housing remote from the housing of the CE space 3, with a connecting conduit for the airflow from the service space to the CE space 3.

At the upstream end 4' of the CE space 3, the air handling system comprises a plenum space 7a with a perforated plate assembly 7 that is positioned upstream with respect to the air flow 8, arranged as inlet for the air flow 8 generated by the air handling system into the CE space 3. The perforated plate assembly 7 comprises a main perforated plate 30 substantially orthogonal to the longitudinal direction of the modular unit and delimited by the modular unit. The perforated plate assembly 7 allows for providing conditioned (or fresh) air to the CE space 3. At the downstream end 4" of the CE space 3, the air handling system comprises an air outlet or exhaust means 9. The exhaust means 9 allow for removal of the air flow after passing the CE space 3. The exhaust means can, for example be, a second plenum space with an exhaust perforated plate assembly.

Figure 2:
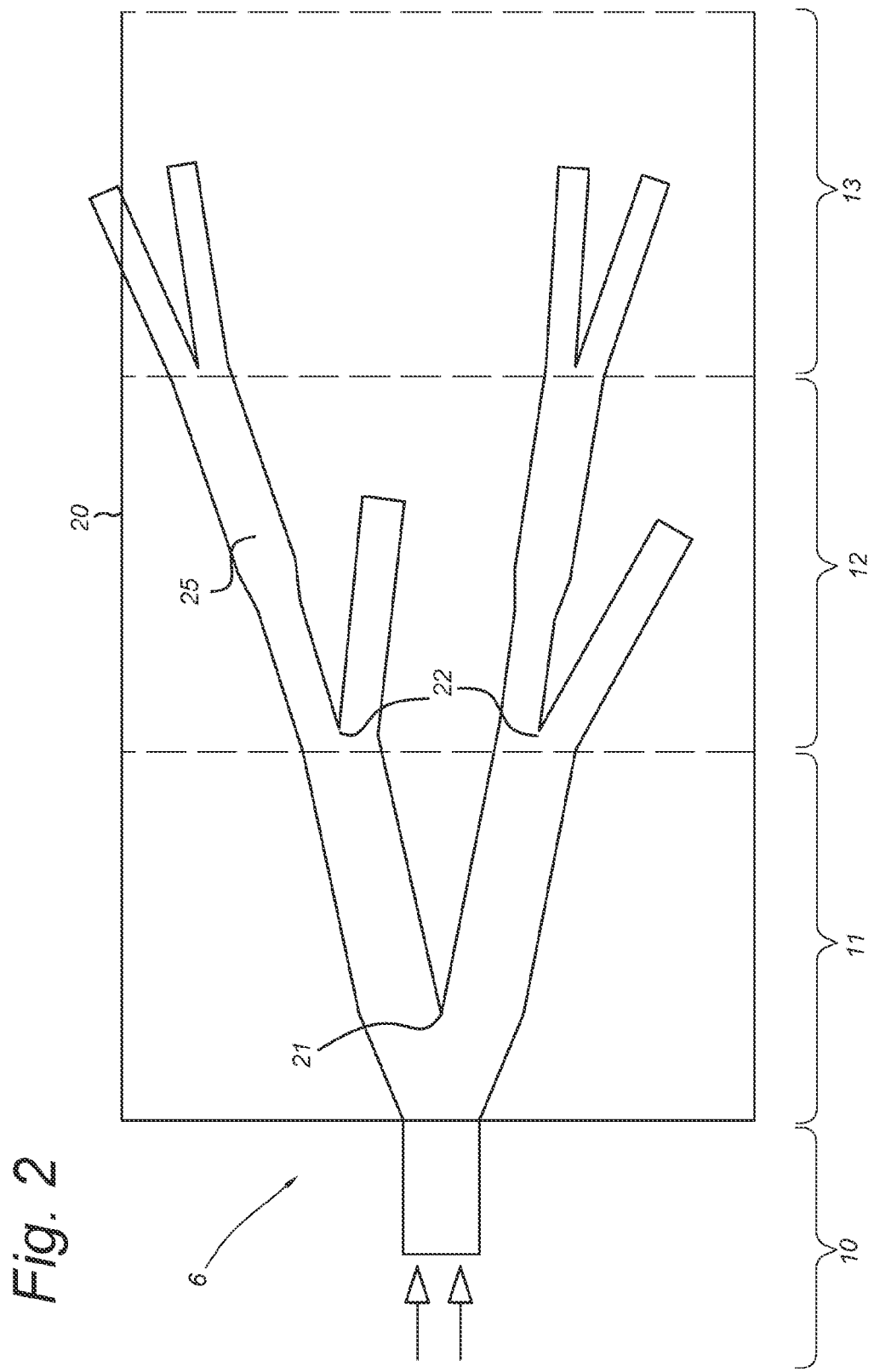
FIG. 2 shows a schematic view of a branched pipe system according to an embodiment of the invention.

In the service space 2, the air handling system comprises an air handling unit (AHU) 5 and a branched pipe system 6 connected to an at least one exhaust end of the AHU. The AHU 5 provides an appropriately conditioned (or fresh) air flow to the branched pipe system 6. The branched pipe system 6 comprises multiple branches, as shown in FIG. 2, guiding the air flow to the perforated plate assembly. Typically, the total cross-section of the pipe system increases at each branching level. In this manner, the air flow rate reduces relatively to the initial air flow rate generated at the air handling unit 5.

Thus, the air flow delivered to the CE space 3 has a relatively low flow rate, and in this manner the air flow 8 in the CE space 3 can be an air flow under laminar flow conditions.

The laminar air flow 8 flows is directed from the front end (upstream) 4' to the rear end (downstream) 4" of the CE space 3.

It is noted that the air flow direction in the CE space 3 can be set from any side to an opposite of the CE space 3 by predetermined arrangement of the positions of the air flow inlet and air flow outlet on the CE space 3. For example, the air flow 8 can be top-down, bottom-up, along the length of the CE space 3, or transverse the length of the CE space 3.

In an embodiment of the invention, the housing is a modular unit or modular container. The modular unit is configured to be integrated with a plurality of other modular identical or similar units to form an assembly of modular units. The assembly of modular units can be arranged to expand horizontally (in transverse and/or longitudinal direction) and/or vertically to fit a space.

The integration of a plurality of modular units into an assembly of modular units, allows for peak shaving during use. During use growth cycles related with the CE space 3 in each one of the multiple units are being spread in such a manner that a most intense use of one of the multiple CE spaces coincides with a least intense use of at least one of the other CE spaces in the container assembly. This feature allows to flatten out demand-driven peaks in process resource load.

It is noted that the CE space 3 is in general a space with a controlled environment. In an embodiment the CE space 3 can be a space for cultivation of crops. Alternatively, the CE space 3 can be a storage space for crops or vegetable goods. Other applications for the CE space 3 are also conceivable.

FIG. 2 shows a schematic view of a branched pipe system 6 according to an embodiment. The branched pipe system 6 comprises a main branch 10. The branched pipe system 6 further comprises an intake branch for guiding the air flow from the at least one exhaust end of the AHU to the main branch 10. The branched pipe system 6 further comprises a tree-like structure 20, comprising branch members 25, wherein the branch members 25 are configured for guiding the air flow from the main branch 10 to different inlet locations of the perforated plate assembly 7.

The tree-like structure 20 is provided with at least one branch level, wherein each level of the at least one branch level is associated with a branching of the tree-like structure 20, as indicated in FIG. 2 by a dotted line.

A first branch level 11 of the at least one branch level comprises a first branching 21 associated with a first degree of branching. In the context of this patent application a degree of branching indicates that at a branching point an upstream tube or conduit is branched into a number of branch members 25 (i.e., tubes or conduits) extending downstream.

In an embodiment according to the invention, the tree-like structure can comprise multiple branch levels, for example four.

A second branch level 12 of the multiple branch levels comprises a second branching 22 associated with a second degree of branching.

A third branch level 13 of the multiple branch levels comprises a third branching associated with a third degree of branching.

A fourth branch level of the multiple branch levels comprises a fourth branching associated with a fourth degree of branching.

A final branch level, for example the fourth branch level, of the multiple branch levels provides the fresh air to the perforated plate assembly 7 through each of the branched tubes or conduits.

Other numbers of branch levels and/or number of branches per branch level are also conceivable.

In an embodiment of the invention, in the flow direction the overall cross-section of the branch members 25 remains at least constant or increases at each branching level. This allows to maintain or reduce flow rate relative to the flow rate generated by the AHU.

In an embodiment of the invention, the branch members of the final branch level cover all perforation holes 31 of the main perforated plate 30 in the perforated plate assembly 7. In a further embodiment of the invention, there is an one-on-one relation between the number of branch members of the final branch level that are coupled to the perforated plate assembly 7, and the perforation holes 31 of the main perforated plate 30. Each perforation hole is coupled or associated with a corresponding one branched tube at the final branch level.

The first degree of branching may be any number larger than one, at least two and may be an even or uneven number.

Figure 3:
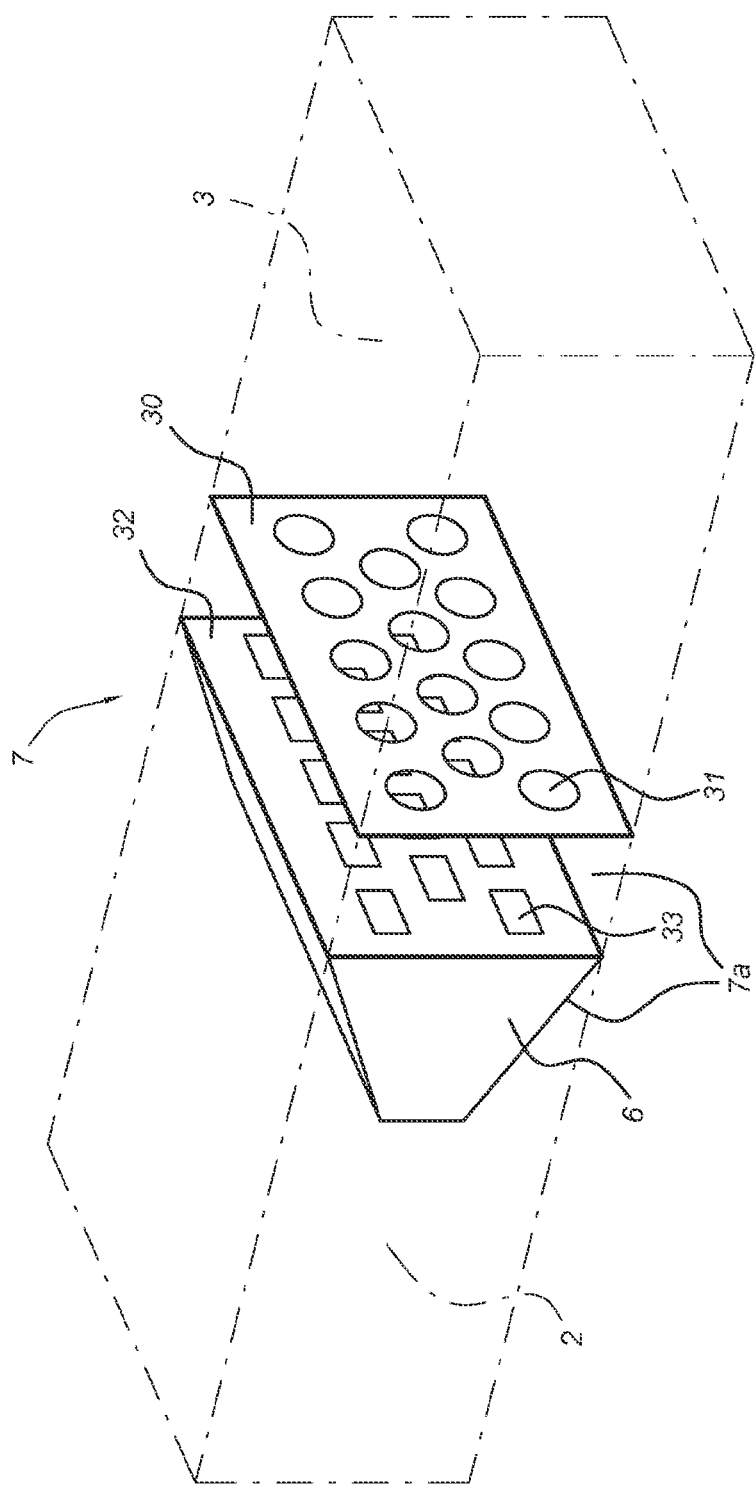
FIG. 3 shows a schematic view of a perforated plate assembly of a air handling system according to an embodiment of the invention.

In an embodiment of the invention, the second, third and fourth degree of branching are equal to the first degree of branching. For example, if the first degree of branching is two, than the second, third and fourth degree of branching are also two, resulting in sixteen branched tubes at the level of the perforated plate assembly FIG. 3 shows a schematic view of a perforated plate assembly 7 of an air handling system according to an embodiment of the invention. In this embodiment, the perforated plate assembly 7 comprises in addition to the main perforated plate 30, a secondary perforated plate 32 arranged on relatively short distance before (that is, adjacent to and upstream of) the main perforated plate.

In an embodiment of the invention, each secondary perforation hole 33 of the secondary perforated plate 32 is coupled or associated with a corresponding one branched tube at the final branch level. The perforation holes 31 of the main perforated plate 30 have a substantially smaller diameter compared to a diameter of the secondary perforation holes 33. For example the diameter of the perforation holes 31 are at most half of the diameter of the secondary perforation holes. In between the main perforation plate 30 and the secondary perforation plate 32 there can be a number of intermediate perforated plates (not shown). Each one of the intermediate perforation plates have intermediate perforation holes with a diameter comparable to the diameter of the perforation holes 31. In this embodiment, the intermediate plates provide that the incoming air flow from the air handling unit has fanned out across the area of the main perforation plate 30.

In an embodiment, the secondary perforated plate 32 in the perforated plate assembly is positioned half-way between the outflow opening of the air flow tubes of the branched pipe system and the main perforated plate 30.

The secondary perforated plate 32 is equipped with secondary perforation holes 33 arranged in the secondary perforated plate's surface.

The perforation holes 31 of the main perforated plate 30 can, for example, have a round, an oval, a square, a rectangular, or any other kind of appropriate shape.

The secondary perforation holes 33 of the secondary perforated plate 32 can have the same shape as the perforation holes 31 of the main perforated plate 30.

In an alternative embodiment, the secondary perforation holes 33 have a different shape as the shape of the perforation holes 31 in the main perforated plate 30.

In an embodiment of the invention, the main perforated plate 30 has a degree of perforation that is equal or larger than the cross-section area of the outflow of the branched pipe system 6. Thus the perforated area of the main perforated plate 30 is equal or larger than the cross-section area of the outflow of the branched pipe system. In an embodiment, the degree of perforation is at least 33%.

In a further embodiment of the invention, the main perforated plate 30 comprises perforation holes 31 with a diameter of about 3 mm and a pitch of about 5 mm.

In a preferred embodiment of the invention, the secondary perforated plate has a degree of perforation that is equal or larger than the cross-section area of the outflow of the branched pipe system 6. Thus the perforated area of the secondary perforated plate 32 is equal or larger than the cross-section area of the outflow of the branched pipe system 6. In a further embodiment of the invention, the secondary perforated plate 32 comprises secondary perforation holes 33 with a diagonal or diameter of about 3 mm and a pitch of about 5 mm.

In an embodiment, the air handling system comprises a dynamic flow control. Typically, the dynamic flow control comprises one or more inflow sensors to measure properties of an incoming air flow that enters the air handling unit, and one or more outflow sensors that measure properties of the air flow that is generated in the air handling unit. The dynamic flow control is arranged to control the flow velocity of the air flow that is generated. In addition the dynamic flow control is arranged with means to pre-condition the generated air flow with respect to temperature and/or humidity. Also, the dynamic flow control can be arranged to control the level of carbon dioxide and/or other gases in the air flow.

Other alternatives and equivalent embodiments of the present invention are conceivable within the idea of the invention, as will be clear to the person skilled in the art. The scope of the invention is limited only by the appended claims.

The invention claimed is:

1. An air handling system for a climate control system, comprising:
   an air handling unit (AHU);
   a housing that forms at least a delimited space with a controlled environment (CE) space, in which the CE space has an upstream end and a downstream end with respect to an air flow generated in the CE space by the AHU;

a pipe system; and a perforated plate assembly comprising at least a main perforated plate, wherein the perforated plate assembly is positioned at the upstream end of the CE space as an air inlet, wherein the AHU is arranged in a service space, and is coupled to the perforated plate assembly at the upstream end of the CE space by the pipe system, wherein the pipe system comprises a branched tree-like structure of conduits having at least one branch level that branches into plural conduits in a direction from the AHU towards the perforated plate assembly, such that the air flows through the perforated plate assembly into the CE space, and wherein the at least one branch level comprises a first branch level, at which a first conduit branches into two or more separate second conduits, and a second branch level, at which each of the separate two or more second conduits branches into two or more separate third conduits.

2. The air handling system according to claim 1, wherein the air flow through the perforated plate assembly into the CE space is a laminar air flow under laminar flow conditions.

3. The air handling system according to claim 2, wherein a laminar flow velocity is lower than about 0.5 m/s.

4. The air handling system according to claim 3, wherein a laminar flow velocity is between about 0.1 and about 0.5 m/s.

5. The air handling system according to claim 2,
wherein the CE space is a space for cultivation or storage of crops, and
wherein the air flow is transverse to a length of the CE space.

6. The air handling system according to claim 1, wherein the housing has a distance between the upstream end and the downstream end of about 10 meters.

7. The air handling system according to claim 1,
wherein the CE space is a space for cultivation or storage of crops, and
wherein the air flow is transverse to a length of the CE space.

8. The air handling system according to claim 1, wherein the perforated plate assembly further comprises a secondary perforated plate positioned between the outflow of the branched tree-like structure of conduits and the main perforated plate.

9. The air handling system according to claim 1, wherein in a flow direction from the air handling unit towards the perforated plate assembly, an overall cross-section of the branched tree-like structure of conduits increases at each branching of the branched tree-like structure of conduits.

10. The air handling system according to claim 1, wherein the main perforated plate comprises perforation holes with a cross-section of about 3 mm and a pitch of about 5 mm.

11. The air handling system according to claim 1, wherein the cross-section of the perforated plate assembly is either about 1×1 m$^2$ or about 1.5×1.5 m$^2$.

12. The air handling system according to claim 1, wherein the perforated area of the secondary perforated plate is equal or larger than the cross-section area of the outflow of the branched tree-like structure of conduits.

13. The air handling system according to claim 12, wherein the secondary perforated plate comprises secondary perforated holes with a cross-section of about 3 mm and a pitch of about 5 mm.

14. A climate control system for climate control in a delimited space that includes at least a CE space, comprising an air handling system according to claim 1.

15. A modular unit comprising a housing arranged with a delimited space that includes at least a CE space, comprising climate control system according to claim 14.

16. An assembly of modular units comprising at least a pair of the modular units according to claim 15.

17. The assembly according to claim 16, wherein the modular units are stacked horizontally or vertically.

18. A modular unit comprising a housing arranged with a delimited space that includes at least a CE space, comprising an air handling system according to claim 1.

19. The air handling system according to claim 1, wherein the housing has a distance between the upstream end and the downstream end of about 10 meters.

20. The air handling system according to claim 1,
wherein the CE space is a space for cultivation or storage of crops, and
wherein the air flow is transverse to a length of the CE space.

* * * * *